3,846,107
MEANS FOR AUTOMATICALLY REGULATING WEIGHT OF ARTICLES IN GLASSWARE FORMING MACHINE
Thomas Vincent Foster, Duncaster, England, and Eginhard Jaeger, Oetwil an der Limmat, Switzerland, assignors to Emhart Corporation, Bloomfield, Conn.
Filed July 26, 1972, Ser. No. 275,364
Int. Cl. C03b 5/26
U.S. Cl. 65—164    6 Claims

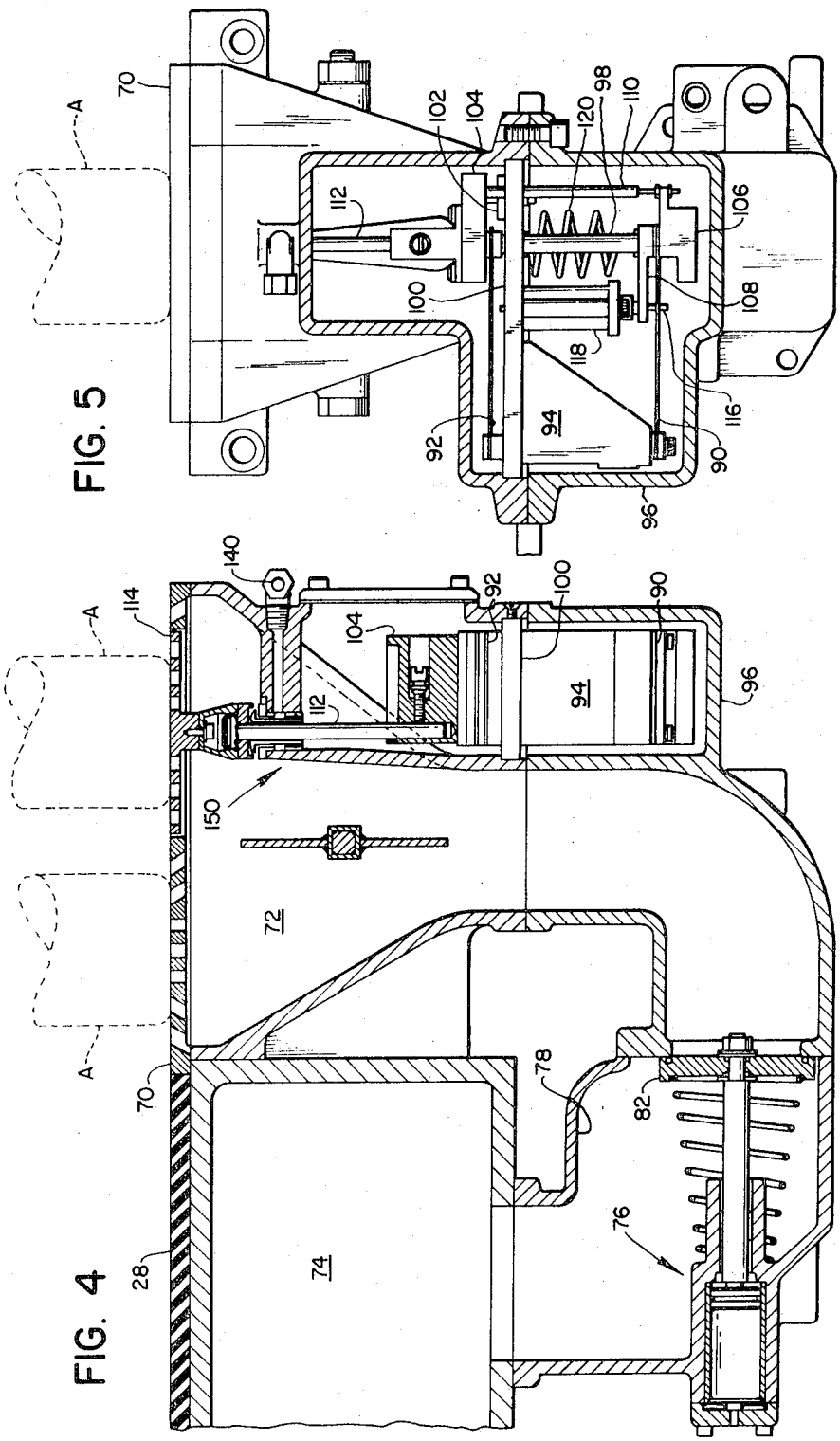

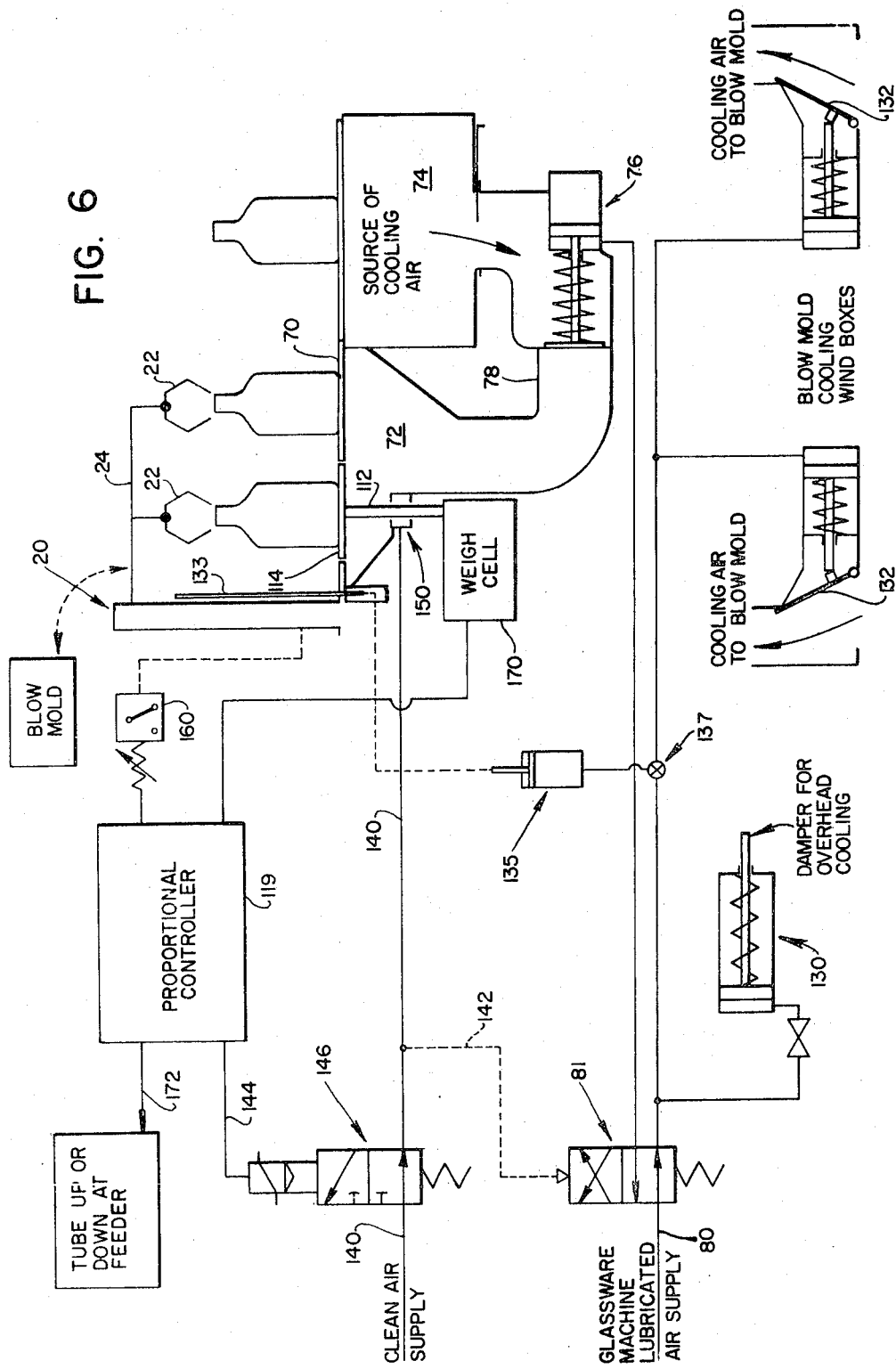

ABSTRACT OF THE DISCLOSURE

Gobs of molten glass are formed at the outlet of a feeder bowl by a feeder mechanism including a continuously rotating refractory tube the lower end of which tube can be moved toward and away from the inside of the bowl to vary the size of the gobs. The glassware forming machine, into which the gobs are fed for forming, includes a final blow mold station from which the articles are taken to be deposited on a perforated deadplate where they are momentarily cooled before being pushed out onto a take-away conveyor. The deadplate includes a tray which is connected to a scale, or weigh cell, which provides a controller with an output proportional to the weight of the newly formed glassware article. The controller is programmed to vary the position of the tube in the feeder bowl when the weigh cell output exceeds predetermined limits.

BACKGROUND OF INVENTION

Apparatus for automatically controlling the weight of glassware articles by varying the vertical position of the refractory tube in a feeder is well known, being shown in U.S. Pat. No. 1,941,552 issued to Henry et al. in 1934. However, in this prior art patent disclosure a photocell is used to compare the length of the gob being formed to a predetermined standard in deriving the signal for the feedback circuit which will regulate the height of the tube.

In the Henry patent disclosure the feeder mechanism includes a continuously rotating refractory tube which can be moved toward and away from the outlet in the feeder bowl to vary the size of the glass gob being formed. The length of the gob so formed is continuously monitored, and the tube height varied to maintain gob length within predetermined limits.

Among the disadvantages of using unsevered gob length as a parameter to regulate the position of the rotating tube are (1) the fact that glass viscosity variations will also effect the weight of the gob being formed, perhaps to a greater extent than the unsevered gob length parameter, (2) the fact that the weight of the gob will also vary due to changes in the operating speed of the glassware forming machine and the feeder mechanism which is synchronized for operation therewith. In the Henry patent disclosure, and in any conventional feeder mechanism, the gob weight will change with changes in glass viscosity. Such changes cause differences in gob length which are not necessarily proportional to changes in gob weight. For example, the gob diameter may decrease with an increase in glass viscosity, and the gob length increase sensed by the Henry apparatus may result in inputs to the feeder which will produce smaller gobs than required by the glassware forming machine to produce the desired glassware product. Similar undesirable effects may result when slight changes in machine operating speed occur.

The present invention, then, has for one of its general objects to provide a system for regulating gob weight by varying the height of the feeder tube in the feeder bowl, which system avoids the foregoing disadvantages of the prior art approach disclosed in the Henry patent by utilizing actual article weight as the primary input parameter, rather than unsevered gob length.

SUMMARY OF INVENTION

This invention relates generally to the automatic regulation of glassware forming machines, and more particularly to controlling gob feeders. In accordance with the present invention a system is disclosed for automatically regulating the weight of glassware articles being formed to assure that these articles fall within predetermined limits.

The system for accomplishing this automatic weight control of the glassware produced in a continuously operating glassware machine includes the following features. In the feeder mechanism for forming the gobs of molten glass which are successively conveyed to the various sections of the machine, the refractory tube which rotates in the well or bowl is mounted for limited vertical adjusting movement to vary the annular opening defined between its lower end and the annular curb in the bowl itself usually associated with the outlet spout and its orifice. A plunger reciprocates conventionally in the tube, and its stroke need not be altered in carrying out the present invention. The tube, and its associated rotating mechanism is movable mounted in the fixed framework of the feeder structure, and a controller is provided to operate a small motor so arranged as to move the tube vertically upwardly to form slightly larger gobs, or downwardly to decrease gob size.

The controller is provided with the necessary input to vary the tube position from a weigh cell located alongside the take-away conveyer at the outfeed end of the glassware forming machine. In the typical I.S. type of glassware forming machine, a take-out mechanism is timed to remove the newly formed ware from the final or blow mold station, and to deposit the ware on a perforated deadplate where the ware is momentarily coled by air which passes upwardly through the deadplate from a chamber therebelow. The ware is then pushed off the deadplate onto the take-away conveyor. The present invention takes advantage of the fact that the newly formed ware remains stationary on the deadplate, and accordingly, a small weight cell is provided below the deadplate chamber with a vertical support extending through the chamber to carry a small circular dish or tray arranged coextensive with the deadplate, but independently mounted, to receive an article from the take-out mechanism for weighing. The output of the weigh cell is fed to the controller for varying the position of the tube in the feeder to control the size of the gobs being fed to the machine, and hence to control the weight of the glassware being produced by the machine.

BRIEF DESCRIPTION OF THE DRAWINGS

FIG. 4 is a vertical sectional view through the deadplate and conveyor structure of FIG. 3, the articles being shown in broken lines in the same locations as in FIG. 3.

FIG. 5 is an end view, partly in section, showing the apparatus of FIG. 4.

FIG. 6 is a schemtic view showing the pneumatic control system and the proportional controller linking the weigh cell located beneath the deadplate of FIGS. 3, 4 and 5 with the refractory tube located in the feeder bowl of FIG. 2.

DETAILED DESCRIPTION

Figure 1:
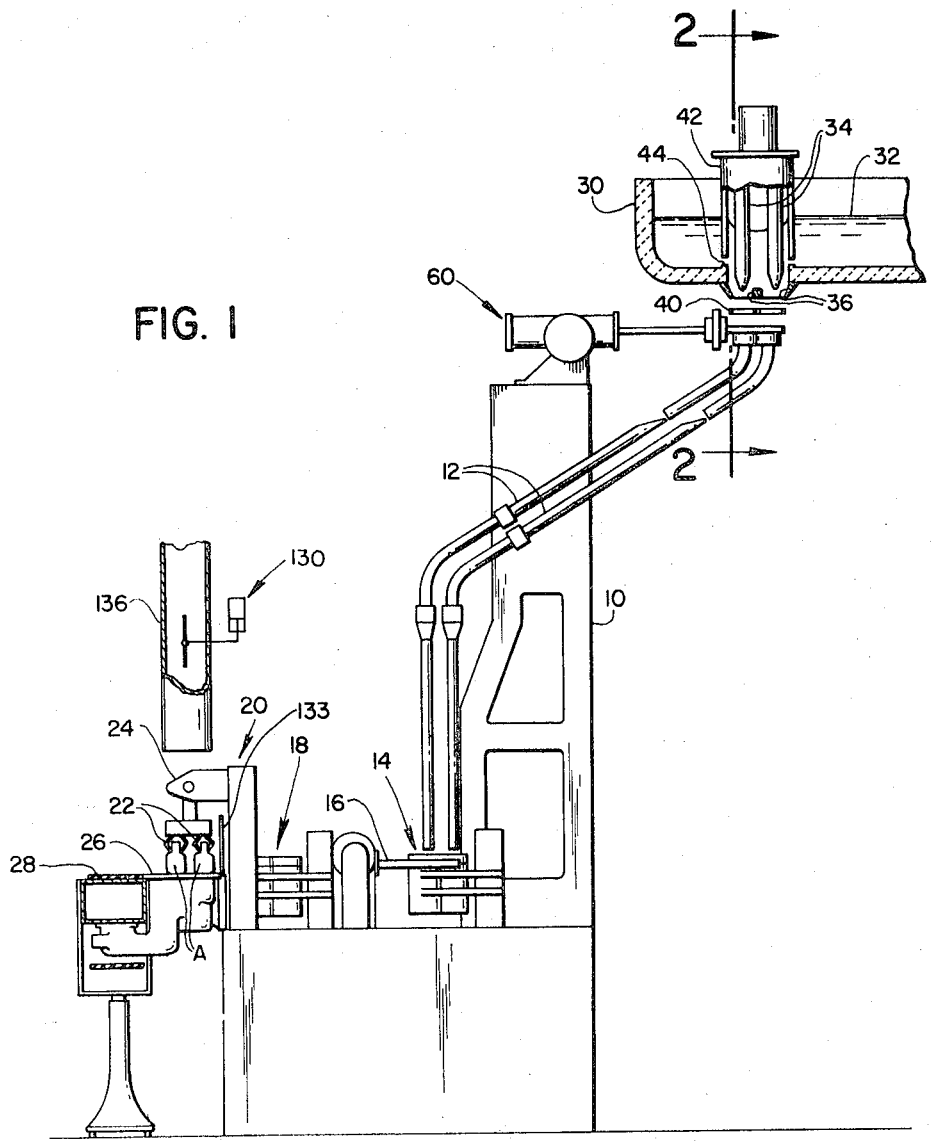
FIG. 1 is a vertical elevational view showing a glassware forming machine together with a feeder mechanism for conveying gobs of glass to the machine, and also showing an outfeed mechanism for removing the newly formed glassware from the machine so that it can be taken away on a conveyor.

Turning now to the drawings in greater detail, FIG. 1 shows a typical Hartford I.S. type glassware forming machine, in schematic fashion. The complete machine will not be described in detail here, and the reader is referred to the Ingle Pat. No. 1,911,119 for a detailed discussion of the I.S. type of machine. It should be noted that the advantages to the present invention can be realized in the environment of any glassware forming machine, and that the I.S. type of machine will be described only insofar as necessary to an understanding of the present invention.

The frame 10 of the glassware forming machine of FIG. 1 includes an upper portion which supports a plurality of fixed troughs 12, 12 suitable for feeding double gobs of molten glass to the blank mold station 14 of the I.S. machine where these gobs are preliminary formed prior to being transferred by the neck ring mechanism 16 to a final or blow mold station 18. The final or blow mold station includes a split mold which can be sequentially opened in timed relationship with other components of the glassware forming machine, and a take-out mechanism 20 in the form of tongs 22, 22 is provided on an arm 24 in this take-out mechanism for movement of the newly formed glassware articles from a bottom plate (not shown) provided in association with the blow mold station 18 to the deadplate structure indicated generally at 26. The newly formed glassware articles are ultimately pushed off this deadplate structure 26 by suitable means (not shown) onto a take-away conveyor 28 which operates continuously to feed the newly formed articles downstream to a lehr or the like.

Figure 2:
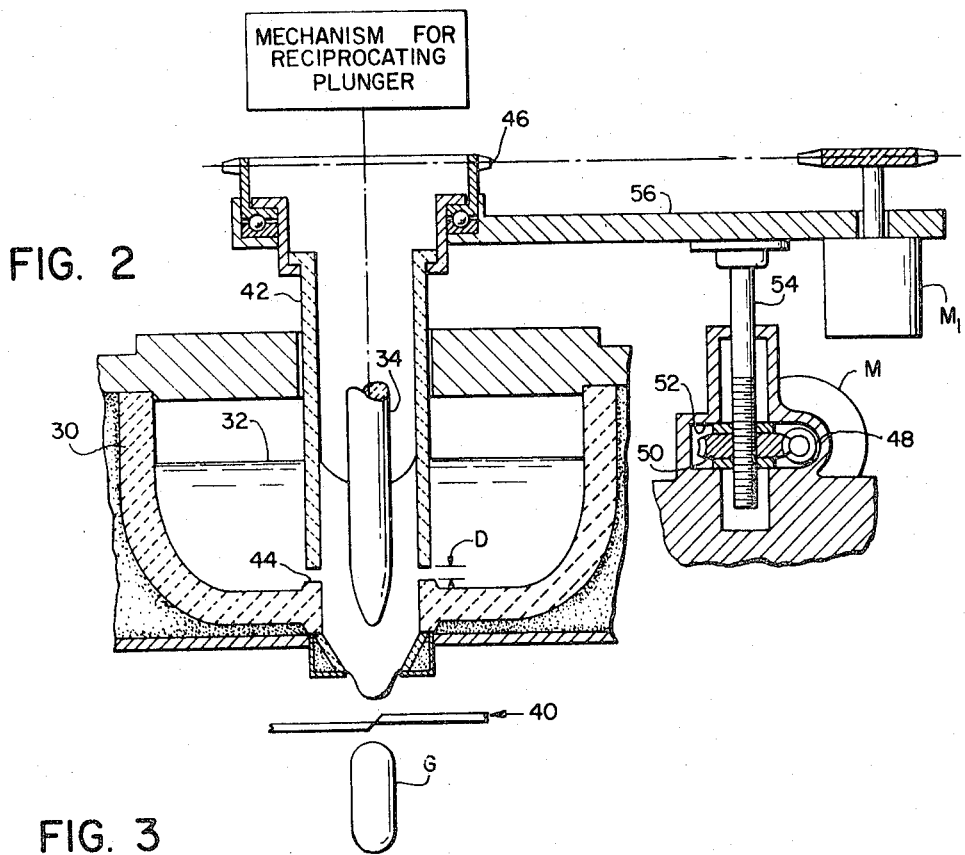
FIG. 2 is a detailed view, drawn to somewhat larger scale than FIG. 1, of a portion of the feeder shown in FIG. 1.

Means is provided for successively forming gobs of glass for delivery to the blank mold station 14, and as shown in FIG. 1 a feeder bowl 30 is provided at the downstream end of a forehearth furnace (not shown) which furnace is capable of maintaining a level 32 of molten glass in the feeder bowl structure. In the double gob configuration shown in FIG. 1 a pair of side-by-side refractory plungers 34, 34 are adapted to be reciprocated by suitable means shown schematically in FIG. 2 so as to feed molten glass downwardly through the side-by-side orifices 36 defined in the orifice plate located for this purpose in the outlet spout of the feeder bowl 30. Shears 40 of conventional construction are adapted to periodically sever the gobs of glass at a point just below the orifice plate as best shown in FIG. 2. As so constructed and arranged side-by-side gobs of glass are sequentially formed in timed relationship with the operation of the glassware forming machine, and gobs of glass are continuously supplied to the troughs 12, 12. It is a feature of present day feeder constructions that a rotating tube, such as shown at 42, is provided with its lower end spaced slightly above a curb 44 defined for this purpose in the inside of the feeder bowl, and this tube 42 serves to keep the molten glass moving in the area where it is about to leave the feeder bowl and to maintain a uniform viscosity in the glass being formed by the plungers into the appropriate gob size. The spacing of the lower end of this tube 42 above the curb 44 serves to control the rate of flow of the molten glass in response to a given stroke of the plungers 34, 34.

FIG. 2 shows the refractory tube 42 in greater detail, together with the chain and sprocket drive 46 for rotating this tube in the feeder bowl 30. The molten glass 32 in the feeder bowl will assume a level dictated by the rate of flow of the molten glass from the forehearth, and inside the tube 42 the glass surface will be concave slightly at least during operation of the plunger 34. This configuration of the melt line will stay relatively constant during operation of the apparatus except for slight variations in the level of the molten glass within the rotating tube 42. The lower end of the tube 42 can be seen to be spaced a distance D above the curb 44 in the feeder bowl, and this distance D is variable in the configuration shown in FIG. 2 by rotation of the motor M. A worm gear 48 provided on the output shaft of the motor M meshes with a gear 50 trapped in a receptacle 52 defined for this purpose in the fixed structure or framework of the feeder. The gear 50 acts in the manner of a captive nut, its internal opening being threaded to receive a support shaft 54 for the entire tube rotating mechanism. The shaft 54 is threaded and threadably received in the captive nut defining the gear 50, and the upper end of this threaded shaft 54 carries a cross arm 56, which cross arm supports the rotating tube 42 at one end and carries at its other end a second motor $M_1$ suitable for rotating the tube 42 continuously in the manner described above.

Thus, the rotating tube 42 is driven continuously in order to move the molten glass within the feeder bowl by the motor $M_1$. The rotating refractory tube 42 is normally located a predetermined distance D above the curb 44 defined for this purpose in the feeder bowl, but this distance D can be varied in response to angular rotation of the motor M through the gearing 48, 50 and threaded shaft 54 described above. The gobs of molten glass formed at the outlet spout of the feeder bowl are successively severed by the shears 40 to provide gobs G of molten glass in the troughs 12 through conventional gob distributor means indicated generally at 60 in FIG. 1. It will be apparent that several stations in a typical I.S. glassware forming machine might be serviced by one feeder mechanism through such a gob distributor 60 in accordance with conventional practice.

Figure 3:
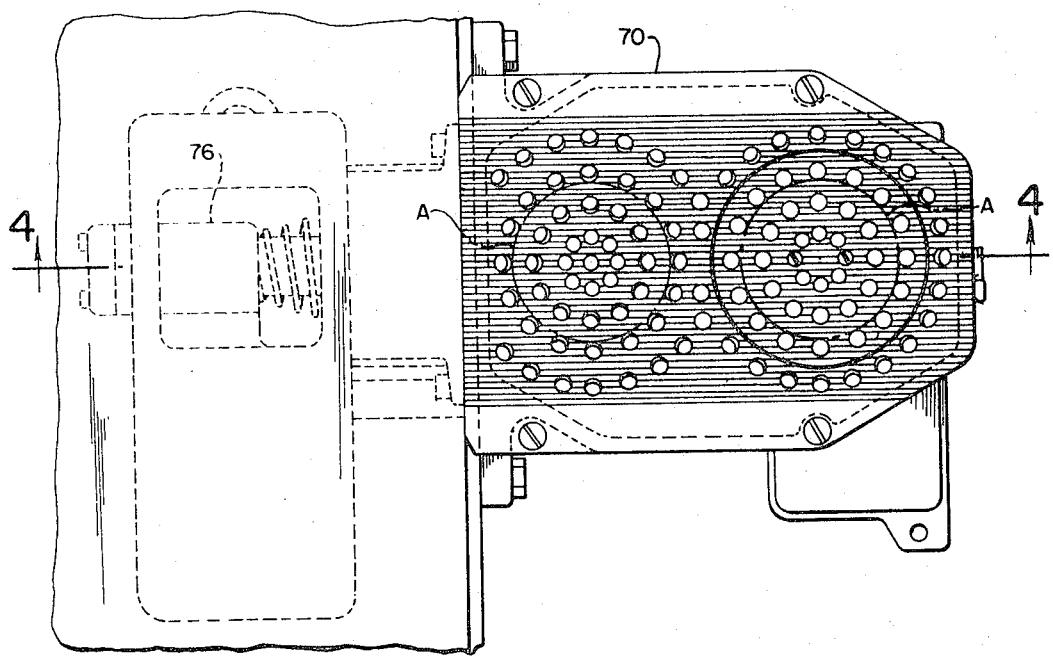
FIG. 3 is a plan view of a double deadplate of the type mounted to one side of the take-away conveyor shown in FIG. 1, showing two newly formed articles in broken lines.

The newly formed articles of glass ware A, A are taken out of the machine at the final blow mold station 18 in FIG. 1 by the take-out mechanism 20, and more particularly by the take-out tongs 22, 22 located at the free end of the take-out arm 24, and these articles are deposited on a perforated deadplate 70 best shown in FIG. 3. The locations for these articles are indicated generally by the broken lines at A, A.

The deadplate 70 defines the upper boundary of a cooling chamber 72 best shown in FIG. 4, which cooling chamber is adapted to be placed in communication with a source of cooling air 74 in the form of a duct provided beneath the upper run of the take-away conveyor 28. A valve means 76 is provided in the passageway 78 which connects the source of cooling air 74 with the chamber 72 and this valve 76 is adapted to be opened, from the closed position shown, in response to air under pressure from the conventional glassware forming machine lubricated air supply as suggested generally at 80 in FIG. 6. In the closed position of the valve means 76 air from the cooling source 74 is prevented from entering the chamber 72 and it is in this closed position that an article A is adapted to be weighed on a tray 114 to be described and provided for this purpose in conjunction with the deadplate structure 70. The valve 76 comprises a conventional air cylinder and piston, the piston having an actuating rod extending through the end of the cylinder and carrying a valve element 82 which is adapted to close an opening in the passageway 78 as shown in detail in FIG. 4. The element 82 is spring loaded to the closed position shown and air to the forward side of the piston through the pneumatic system shown at FIG. 6 is adapted to move the piston from the position shown to a suitable position for opening this valve 76.

Turning now to a more detailed description of the means for weighing at least one of the articles A while it remains stationary on the deadplate 70, that is after it has been deposited thereon, and prior to being pushed off the deadplate by a conventional push off mechanism for removal on the take-away conveyor 28, FIGS. 4 and 5 show the configuration for this article weighing means in some detail. The weighing cell itself comprises a pair of horizontally extending parallel springs 90 and 92 extending cantilever fashion from a fixed support 94 provided for this purpose in the fixed housing 96 located in the fixed portion of the deadplate supporting structure. The free ends of these cantilever springs 90 and 92 are connected to one another by a pair of vertical supports 98, 98 one of which is shown in FIG. 5. These posts or supports 98, 98 serve to maintain the parallel relationship between the cantilever springs 90 and 92. A fixed beam 100 is provided in the housing 96 in a stationary fashion being carried by the block 94 which supports the springs 90 and 92 in cantilever fashion in the manner described above. A dash pot 102 is provided between this fixed cross beam 100 and an upper block 104 associated with the upper leaf spring 92. A pair of blocks 106 and 108 serve to clamp the lower cantilevered spring 90, and the blocks 106 and 104 are themselves linked together by a pair of rods 110, 110 one of which is shown in FIG. 5. The upper block 104 carries a vertical support shaft 112 best shown in FIG. 4 which shaft carries a dish or tray 114 at its upper end for supporting the article A to be weighed. With a weight present on the tray 114, support shaft 112 will be depressed slightly against the resiliency of the scales springs 90 and 92 causing limited vertical movement of the blocks 104 and 106 thereby causing limited downward movement of the block 108 so that a plunger 116 is moved downwardly in its coil 118 causing an output signal to be generated for a proportional controller 119 best shown in FIG. 6. The coil 118, best shown in FIG. 5, is mounted to the underside of the fixed cross beam 100, and minute displacements of the plunger 116 carried by the block 108 will cause variable output voltage signals to be generated to the proportional controller 119. Since only the weight of an article A in the tray 114 is necessary for the controller 119 to perform its function a tare adjustment is provided in the form of spring 120 so as to overcome the tare weight of the tray 114 and its associated support shaft 112. The dash pot 112 described above serves to dampen out movement of the plunger 116 in the coil 118 caused by placing of the article A on the dish 114. The weigh cell described in this paragraph may comprise a conventional component of the system disclosed herein, and such a unit is available commercially from Automatic Timing and Controls, Inc. of King of Prussia, Pa., U.S.A.

The dish or tray 114 is itself perforated in order to assist in cooling of articles A, A placed for this purpose on the deadplate 70. Preferably, the weight control device described herein is adapted to be selectively operated, and to be placed in an inactive status should the glassware forming machine and its associated feeder be functioning satisfactorily. In such a case valve 76 would be left in its open condition, and cooling air would be available from the chamber 72 to cool both articles A, A available on the deadplates 70. In such a configuration control valve 81 would be in the opposite position from that shown in FIG. 6, allowing air cylinder 130 to be deenergized, and also allowing control valves 132, 132 associated with the blow mold cooling wind boxes at the final or blow mold station of the machine to also be opened. In this configuration cooling air would be available to the blow mold, as well as to the overhead duct 136 provided above the deadplate and best shown in FIG. 1, and cooling air would of course be available to the chamber 72 beneath the deadplate for cooling of the articles placed therein by the take-out tongs 22. From FIG. 6 it will be apparent that pressure in the line 140 is effective to position the damper valves 130 and 132 as well as the valve 76 in the manner referred to above through the branch line 142. However, and also as a result of pressure in the line 140 clean air is available to purge the bearing 150 associated with the support shaft 112 for the dish or tray 114. This air is provided in the line 140 as best shown in FIG. 4 to be certain that no foreign material from the glassware machine lubricated cooling air supply in the chamber 72 enters the rather sensitive bearing area associated with the support shaft 112 of the weigh cell. However, when a weight check is to be accomplished a signal in the line 144 from the controller 119 will move the valve 146 from the position shown in FIG. 6 to its alternative position removing the supply of clean air to the shuttle valve 81 causing valve 76 to close and causing damper 130 to return to its closed position as well as closing the shutter valves 132, 132 associated with the blow mold cooling wind boxes. Also as a result of a signal 144 to shuttle valve 146 will be the removal of the clean air supply to the bearing 150 for the support shaft 112 of the weigh scale. However, as a resuult of the continuous application of clean air supply through the line 140 to the bearing 150, this bearing will remain clean and will operate satisfactorily when a weight check is to be made, clean air to purge the bearing being reapplied as soon as a weight check has been made. It should perhaps be noted that closing of the valves 132, 132, associated with the blow mold cooling wind boxes (not shown), will result in decreased cooling of the blow mold during operation of the weigh cell. While this momentary pause in cooling at the blow mold station is acceptable when the machine is set up to form relatively light weight glassware, this cooling may be maintained, if necessary in the forming of heavier ware, by installing a retractable shield 133 between the blow mold station and the weighing station, and allowing the cooling air to the blow mold to continue during operation of the weigh cell. As shown in FIG. 6 the shield 133 is movable vertically between the raised position shown, and a retracted position by an actuator 135 similar to the actuator for damper 130. A selector valve 137 permits the shield to be raised automatically during each weighing, or permits closing valves 132, 132 instead as described in the paragraph to follow.

As shown in FIG. 6 the controller 119 is adapted to be automatically sequenced in its operation through the line 160 associated with the take-out mechanism 20. Whenever newly formed articles A, A are deposited on the deadplate 70 by the pneumatically operated take-out arm 24 a pressure transducer 160 associated with the pneumatic actuator for the take-out mechanism 20 will be energized providing a signal to the controller 119, and in this manner provide a convenient interrogate pulse for the controller, so that the weigh cell 170 described above can function in the manner set forth. The controller 119 is preset to provide a programmed output 172 when the weigh cell detects an article weight as being above or below the predetermined limits set in the controller 119. When these limits are exceeded an up or down signal is provided in the line 172 to the motor M associated with the raising or lowering of the rotating tube 42 in the feeder bowl 30. The proportional controller 119 is programmed only to the extent that the motor M associated with raising and lowering the tube 42 is controlled in step by step manner to avoid overshooting.

We claim:

1. In a glassware forming machine wherein gobs of molten glass are fed from a feeder into the upwardly open blank molds, and wherein the glassware articles are removed from the final forming station by a take-out mechanism for deposit on a cooled deadplate where they momentarily remain stationary prior to being swept off the deadplate onto a take-away conveyor, the improvement comprising, said feeder including a bowl with a lower outlet portion defined by an annular curb, and said feeder also including a refractory tube with its lower end located in spaced relation to the curb, and means for adjustably positioning said tube toward and away from said annular curb, said cooled deadplate having a plenum chamber therebelow which chamber normally communicates with a source of cooling air, valve means for selectively isolating said chamber from said source of cooling air, weighing means associated with said deadplate and including a perforated platform coextensive with said deadplate, said weighing means including a weigh cell for producing an output which is proportional to the weight of an article on said platform, controller means for said tube positioning means to raise the tube when said weigh cell output falls below a preset minimum and for lowering the tube when said output exceeds a preset minimum, and means for synchronizing said valve means to isolate said chamber and to operate said weigh cell only when an article is positioned on said platform.

2. The combination set forth in claim 4 further characterized by an air cooling duct above said deadplate, and valve means in the duct for interrupting the flow of cooling air from above the deadplate during operation of said article weighing means.

3. The combination set forth in claim 1 further characterized by air cooling ducts associated with said final mold station, and valve means in said ducts for interrupting the flow of cooling air at said final mold station during operation of said article weighing means.

4. The combination set forth in claim 1 further characterized in that said weighing means includes a tray arranged in an opening defined for it in said perforated platform, said tray also being perforated and cooperating with said perforated platform to define the upper boundary of said chamber, a vertical support shaft having an upper end for supporting said tray and a lower end extending outside said chamber, and said weighing means further including a weighing cell external to said chamber and actively connected to the lower end of said support shaft.

5. The combination set forth in claim 4 further characterized by an air vent for said support shaft at the upper boundary of said chamber, a source of clean air for said air vent, and valve means for selectively placing said air vent in communication with said source of clean air during operation of said deadplate cooling means and for isolating said air vent from said clean air source during operation of said article weighing means.

6. The combination set forth in claim 1 further characterized by air cooling ducts associated with said final mold station, and a shield retractably mounted between said final mold station and said deadplate, power means for moving said shield into its active position to isolate said weighing means from said final mold station, and control means for said shield moving means to so isolate said weighing means during operation of said weighing means only.

References Cited
UNITED STATES PATENTS

| | | | |
|---|---|---|---|
| 1,592,253 | 7/1926 | Beeth | 65—164 |
| 2,306,789 | 12/1942 | McNamara | 65—164 X |
| 2,950,571 | 8/1960 | Wythe | 65—164 |
| 3,192,027 | 6/1963 | Wilhelm | 65—164 X |
| 3,502,457 | 3/1970 | Bublitz et al. | 65—164 X |
| 3,220,566 | 11/1963 | Rowe | 65—260 X |
| 3,303,013 | 2/1967 | Mumford et al. | 65—260 |

FRANK W. MIGA, Primary Examiner

U.S. Cl. X.R.

65—330, 207